W. HOLT.
Cotton Chopper.
No. 102,541. Patented May 3, 1870.
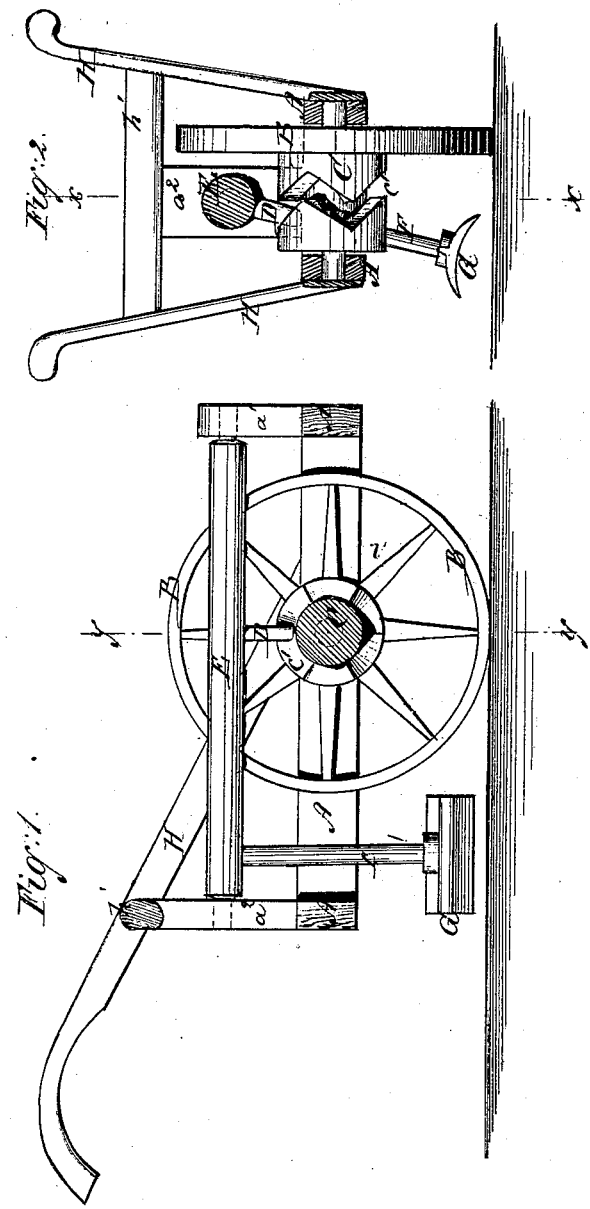
Witnesses:
Jno. F. Brooks
Edgar Tate.
Inventor:
W. Holt.
per
Attorneys.

United States Patent Office.

WILSON HOLT, OF DAWSON, GEORGIA.

Letters Patent No. 102,541, dated May 3, 1870.

IMPROVEMENT IN COTTON-CHOPPER

The Schedule referred to in these Letters Patent and making part of the same.

*To all whom it may concern:*

Be it known that I, WILSON HOLT, of Dawson, in the county of Terrell and State of Georgia, have invented a new and useful Improvement in Cotton-Choppers; and I do hereby declare that the following is a full, clear, and exact description thereof, which will enable others skilled in the art to make and use the same, reference being had to the accompanying drawings forming part of this specification, in which—

Figure 1 is a detail longitudinal section of my improved machine, taken through the line $x\ x$, fig. 2.

Figure 2 is a detail vertical cross-section of the same, taken through the line $y\ y$, fig. 1.

Similar letters of reference indicate corresponding parts.

My invention has for its object to furnish a cheap, simple, convenient, and effective machine for chopping or shaving off cotton-plants, weeds, grass, &c.; and It consists in the construction and combination of the various parts of the machine, as hereinafter more fully described.

A is the frame of the machine, to the forward end of which the draft is attached.

B is the drive-wheel, which may be made of wood with an iron tire.

The wheel B is rigidly attached to one end of a large hub, C, the journals of which revolve in bearings attached to or formed in the middle part of the side beams of the frame A.

In the hub C is formed a zigzag groove, $c'$, in which works the arm or pin D, attached to the rock-shaft E, the journals of which work in bearings in the standards $a^1\ a^2$, attached to the front and rear ends of the frame A.

To the rear part of the rock-shaft E is attached an arm, F, to the lower end of which is attached a plate or hoe, G, which is sharpened upon its front and side edges.

H are the handles, the forward ends of which are attached to the side bars of the frame A.

The upper ends of the handles H are connected by a round, $h'$, which is attached to the upper end of the standard $a^2$, so as to firmly support the said handles in position.

By this construction, as the machine is drawn forward, its forward motion will cause the hoe or cutter G to swing from side to side, cutting or shaving off the plants, weeds, grass, &c., with which it may come in contact.

Having thus described my invention,

I claim as new and desire to secure by Letters Patent—

The arrangement of cam-groove $c'$, which actuates the arm of the hoe G, on a boss of the draft-wheel, as shown and described.

WILSON HOLT.

Witnesses:
JESSE ROGERS,
JOHN P. ALLEN.